Dec. 22, 1942.  R. W. SMEATON  2,305,588
PHOTOFLASH SYNCHRONIZER
Filed May 11, 1940
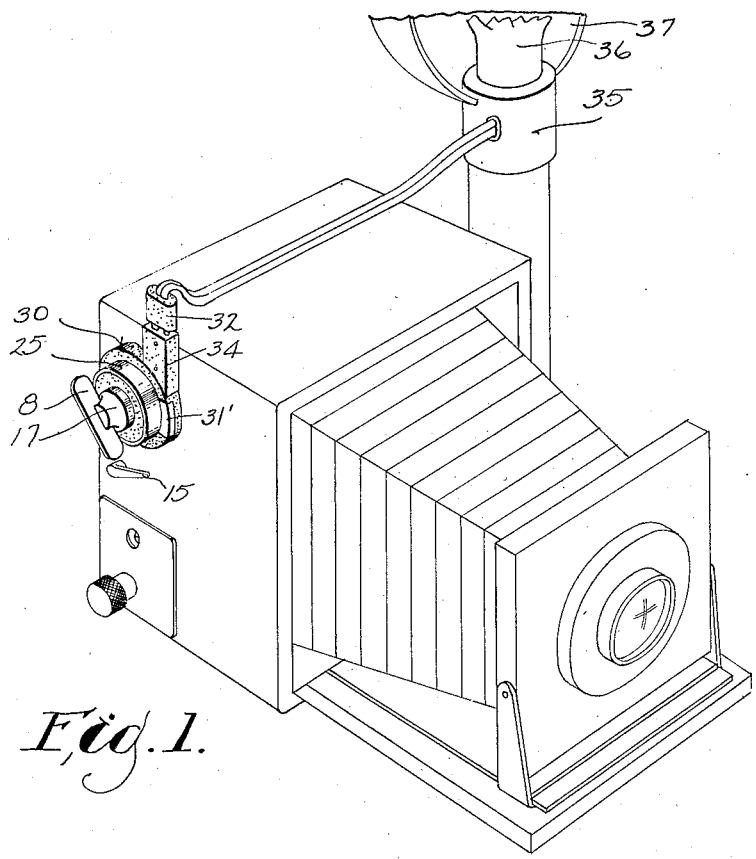
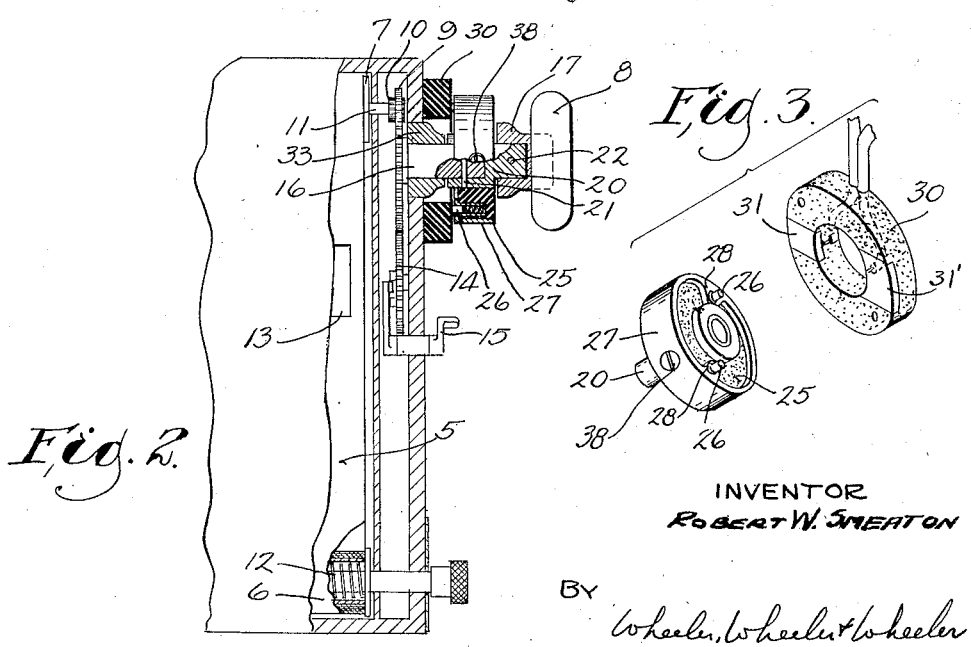
INVENTOR
Robert W. Smeaton
BY
Wheeler, Wheeler & Wheeler
ATTORNEYS Patented Dec. 22, 1942

2,305,588

UNITED STATES PATENT OFFICE 2,305,588

PHOTOFLASH SYNCHRONIZER

Robert W. Smeaton, Milwaukee, Wis.

Application May 11, 1940, Serial No. 334,527

12 Claims. (Cl. 67—29)

This invention relates to improvements in photoflash synchronizers.

It is the primary object of the invention to provide a convenient, simple and inexpensive means for accurately synchronizing the operation of a flash lamp with the operation of a camera shutter of the curtain type.

Specifically it is an object of the invention to provide a type of flash lamp synchronizing switch which can be mounted on the winding key shaft to control successively the synchronization of the flash not merely with one opening in the curtain shutter, but with several such openings without intermediate adjustment. It will be understood that in cameras using curtain type shutters a plurality of openings or slots of different width are provided at different points in the shutter, and generally in each 180 degree rotation of the winding key one of these openings traverses the film or plate to expose the sensitized surface. In each half turn of the key there is a datum point from which the shutter mechanism starts for a given exposure. The duration of the exposure is a function of the spring tension at that datum point and the particular exposure aperture which is moved across the plate or film in the 180 degree rotation of the key.

I have found, however, that there are many variables involved in any attempt to synchronize the operation of a flash bulb to the movement of the curtain shutter so that the exposure of the entire plate or film will occur during the period in which the flash is at a high level of effectiveness.

As the key is wound from one position to the next to bring different apertures into position for exposure the tension increases, introducing one variable. As the key unwinds the angle through which the key moves to the point where the exposure commences by registration of the aperture with the sensitized surface is frequently different in the case of each different aperture in the curtain type shutter. The rate of travel of a curtain shutter varies considerably in different cameras, even of the same make and model, due either to variation in the condition of the curtain spring or the condition of the parts. It is therefore an object of the present invention to provide a structure which, notwithstanding the aforesaid variable factors, may be adjusted to provide preliminary settings sufficiently accurate to synchronize the operation of the flash with the operation of the shutter at most, if not all, of the shutter apertures.

While many different types of synchronizing switches may be employed, it is my purpose to provide in this mechanism a switch of a type in which preferably, though not necessarily, the electrical circuit is isolated from the case or other metal parts of the camera assembly in order to preclude the possibility of an accidental discharge of the flash bulb or loss of battery current through grounding of some portion of the flash mechanism on the camera.

It is my further purpose to provide a device which will not be a makeshift attachment but which, when installed on the camera, will become a permanent component part thereof and constitute an attractive feature of the camera without detracting from the appearance of the apparatus as a whole and without interference with normal use of the camera under natural light conditions.

In the drawing:

Figure 1 is a view in perspective of a camera with a flash bulb igniter and a synchronizing device embodying the present invention.

Figure 2 is an enlarged view fragmentarily illustrating in rear elevation the back of the camera broken away to expose in section my synchronizing attachment and portions of the camera mechanism in conjunction with which the attachment operates.

Figure 3 shows in perspective details of the synchronizing switch.

Like parts are identified by the same reference characters throughout the several views.

The camera may be of any conventional type but the device is particularly adapted for use with that type of camera in which the exposure is controlled by a curtain type shutter 5 secured at one end to a spring roller 6 and secured at its other end on a winding roll 7 which is turned by key 8, gear 9, pinion 10, and shaft 11 to subject the winding spring 12 in roller 6 to the proper tension and to bring the proper shutter opening 13 of curtain 5 into position. When the key is turned to the proper point it is held by a detent 14 released by the control lever 15 to trip the shutter. As thus far described, the mechanism is conventional, it being understood that the winding key 8 is conventionally mounted directly on the shaft 16 which carries the gear 9.

For the purposes of the present invention the winding key shaft is extended in some manner to provide space within which to mount switch mechanism hereinafter to be described. In the exemplification disclosed, the hub portion 17 of the key is removed from shaft 16 and a shaft adapter is substituted. At its larger end this adapter is socketed to receive the end of shaft 16 in place of hub 17, which it replaces. At its smaller end the adapter 20 is received into the hub 17, as clearly shown in Figure 2. The pin 21 holds the adapter 20 to the shaft 16. A similar pin at 22 holds the hub 17 of the winding key to the adapter.

Mounted on the adapter, preferably on its larger cross section in order to be as close as possible to the camera case 4, is a contact carrier 25 which is preferably made of plastic or other dielectric material and is socketed to receive the spring pressed brushes 26. A peripheral band 27 of metal has ear portions 28 engaging the brushes 26 and serving, in this particular construction, as a means for electrically connecting the brushes. The brushes, thus connected, comprise a bridge type contactor co-acting with two fixed terminal contacts hereinafter to be described, this arrangement making it possible to control the circuit without any ground to the camera case in accordance with the objectives previously stated.

The brushes operate on the flat surface of an annular terminal head 30 which is likewise made of dielectric material such as plastic or fiber and has terminal contacts 31 inlaid flush with its surface at diametrically opposite points to be wiped by the brushes 26 in the course of rotation of the contact carrier respecting the terminal head. The annular form of the terminal head 30 enables it to be affixed to the camera case 4 concentrically with the bushing 33 in which the key shaft 16 is rotatable.

The terminal head does not necessarily have to be annular, nor is it necessary that the terminal contacts be disposed in its face. The particular switch structure will be adapted to the requirements of the type of camera on which the mechanism is mounted.

A detachable connection comprising a plug 32 and receptacle 34 is preferably employed in the connections between the terminal contacts 31 of the terminal head and the flash device which it is desired to synchronize with the operation of the shutter. Such flash device may comprise a conventional mounting socket 35 supporting bulb 36 and reflector 37 from the camera case. Either the plug or the receptacle may be secured to the camera case immediately adjacent the terminal head.

The conventional camera of this type is already designed in such a way that for each 180 degree rotation of the key 8 a given shutter opening 13 is actuated under a given tension of spring 12 past the film or plate to be exposed. Consequently, regardless of which shutter opening is used, there is always in any given camera a predetermined relation between the movement of the shutter opening and the movement of the winding key shaft. This relation is different for the winding key shaft, because of the interposed gearing, from the relation which obtains between the shutter and any other portion of the apparatus.

As above indicated, the relation between the movement of successive shutter openings and the movement of the winding key is not always alike. Thus, the particular angular position of the key on a given camera, while always the same for any given shutter opening as long as the condition of the camera remains unchanged, is different as between the different exposure slots in the shutter. Yet for proper synchronization it is essential that the flash bulb be ignited at exactly the same instant preliminary to a movement of any of the various shutter slots across the film or plate to be exposed.

I have found that I am able to take care of this variable factor by using terminal contacts 31 and 31' which are of different widths and by locating the brushes at varying points in cameras of different size but approximately 185 degrees to 195 degrees apart in one half turn of the winding key shaft and a corresponding number of degrees less than 180 degrees in the other half turn of the winding key shaft.

There are four narrow slots in the average curtain in addition to the full size aperture used for time exposures or for focusing. The initial synchronization of the moving contacts 26 to time their engagement with the fixed contacts 31 in proper relation to the movement of the shutter opening is readily obtained by mounting either the moving contact carrier or the terminal head for a calibrating adjustment.

In the particular device shown, the moving contact carrier 25 is adjustable, being mounted upon the extension shaft 20, the proper adjustment being held by the set screw shown at 38. In the event that re-synchronization should ever become necessary on account of accidental damage to the camera or on account of the wear of the mechanism or the weakening of the spring tensions, the device can be re-synchronized by simply loosening the set screws and resetting the contact carrier at the proper point, whereby the closing of the switch contacts is either advanced or retarded with reference to the movement of the exposure aperture. Once the device has been properly set at the proper point of synchronization in any given camera it will again synchronize with reference to the same shutter apertures for which it was originally designed to synchronize.

Due to the fact that the brushes are not diametrically opposite each other, the switch will have alternately a movement first through a long arc and then through a short arc before making contact. The switch is adjusted so that the first contact that is made follows a movement through the longer arc of the series to close the switch in synchronism with the movement of the first shutter opening. The movement of the key through the short arc will thereupon close the switch to ignite the flash in synchronism with the passage of the second shutter opening. It is impossible in the case of some cameras to synchronize the device with the third shutter aperture, but it will be found that when the switch again moves through the short arc the contact will be closed to flash the bulb in synchronism with the fourth shutter opening. In other cameras a very precise indexing adjustment of the contact carrier 27 upon the adapter may be made which will permit even third shutter synchronization in addition to the other three.

In accordance with conventional practice the plate or film will be protected during the winding of the curtain shutter 5 by a slide, or a retractible mirror, or a front shutter, not shown.

It will be understood that the flash device ordinarily contains a battery as well as the lamp, and the switch herein disclosed merely closes the circuit between the lamp and the battery self-contained in the flash unit. So far as the present invention is concerned, any conventional type of flash unit may be employed subject to the control of the switch herein disclosed. If the flash unit does not have a separate series switch for preventing ignition of the lamp during the rewinding of the shutter, the lamp may be either left unscrewed during the winding of the shutter or the connection thereto may be broken by separating the plug and receptacles 32 and 34.

I claim:

1. In a synchronizing attachment for a camera having an apron type shutter and a projecting winding shaft rotatable during the exposure movement of the shutter and provided with a winding handle detachable therefrom, the combination of an annular terminal head provided with terminal contact means and applicable to a camera case about the said shutter winding shaft thereof, an extension adapter provided at one end with a portion engageable with the winding shaft in lieu of its handle and provided at its other end with means to which the original handle is applicable, and a switch contact carrier mounted on the adapter and provided with contact means engageable with the contact means of the terminal head as a synchronizing switch.

2. In a synchronizing attachment for a camera having an apron type shutter and a projecting winding shaft rotatable approximately 180 degrees during the exposure movement of the shutter and provided with a detachable winding handle, the combination of an annular terminal head provided with terminal contact means and applicable to the camera case about the shutter winding shaft thereof upon the removal of said handle, an extension adapter applicable to the winding shaft in lieu of its original handle and provided at its free end with a handle for said shaft, said adapter being provided with a switch contact carrier, and contact means mounted thereon and engageable with the contact means of the terminal head as a synchronizing switch, at least one of said contact means comprising peripherally spaced contacts and the other of said contact means comprising a bridging contactor engageable with said peripherally spaced contacts twice in each rotation of said adapter.

3. The construction set forth in claim 2 in which the contact carrier is mounted on the adapter for indexing adjustment with respect thereto and with respect to the camera key shaft to which the adapter is connected.

4. In a device of the character described, the combination with a camera having a case, an apertured curtain shutter adapted for predetermined movement in the course of each exposure, a winding roll with which said shutter is connected, tension means for moving said shutter from said winding roll, a key shaft for winding said shutter on said winding roll in opposition to said tension means, said key shaft and winding roll being provided with interconnecting gearing of such ratio that said key shaft makes a half rotation for each exposure movement of the shutter, a bushing projecting from the camera case and providing a bearing for the key shaft, an annular terminal head connected with the camera case about the bushing and provided with fixed contact means, an extension adapter connected with the key shaft to project therebeyond, a contact carrier mounted on the adapter for indexing movement and provided with means for fixing its indexed position on said adapter, said carrier having relatively movable contact means engageable with the contact means of the terminal head in the course of each half rotation of the key shaft, and a winding key on the end of said extension adapter.

5. In a flash synchronizer adapted to be incorporated in the mechanism of a conventional curtain shutter camera having a key shaft and key without disturbing the interior of the camera mechanism, the key shaft and key of the camera being rotatable in the course of the exposure movement of the shutter, the combination with an annular terminal head provided with contact means and adapted to be mounted on a camera case about the key shaft, of an extension adapter adjustably mounted on the key shaft and constituting a means for connecting the shaft and its key, and a contact carrier provided with contact means engageable with the contact means of the terminal head and mounted on the adapter for rotation therewith between open circuit and closed circuit positions.

6. In a camera mechanism, the combination with a curtain type shutter provided with a series of exposure apertures, of a winding shaft for said shutter, means connected therewith to make 180 degrees of rotative movement in the course of each exposure movement of a shutter aperture and a synchronizing switch comprising a contactor connected with said means, and a terminal head with respect to which said contactor is movable, said contactor and terminal head having complementary contacts so positioned as to engage in less than 180 degrees of movement of said means in one half turn thereof and in more than 180 degrees of movement of said means in the next successive half turn thereof.

7. In a camera, the combination with a curtain type shutter having exposure apertures of differing width and a shaft for said shutter rotatable during exposure movement of the shutter, of a terminal head provided with fixed contact means and having a mounting adjacent said winding shaft, a contact carrier connected with the winding shaft and provided with a bridge type contactor comprising a plurality of contacts positioned for engagement with the contacts of said head, means for effecting relative angular adjustment between the carrier and the terminal head with said shaft stationary, and detent means provided with a release for interrupting the rotation of said shaft in each one half rotation thereof, the contacts of said carrier and terminal head being offset for engagement in a less angular rotation of said shaft from one position of its restraint by said means than from the next subsequent position of its restraint by said detent means.

8. In a device of the character described, the combination with a curtain type shutter provided with successive exposure apertures, of a shaft therefor having an exposed end and connected with the shutter to rotate during exposure movement thereof, a stationary support, a terminal contact carrier mounted on said support, a movable contact carrier mounted on said winding shaft, and cooperating contacts on said carriers, the contacts on one said carrier being of differing width and the contacts on the other carrier being angularly offset from diametrically opposed positions, the contacts of one of said carriers being in electrical connection with each other.

9. In a device of the character described, the combination with a camera shutter of the curtain type provided with a series of apertures, of a shaft for said shutter connected with said shutter for rotation during the exposure movement of the shutter, a contact carrier connected with the winding shaft, a stationary support adjacent the winding shaft provided with a second contact carrier, and cooperating contacts on the respective carriers, at least one of said carriers having two contacts arranged to co-act with the contacts of the other carrier in each half rotation of the winding shaft, said two contacts being angularly offset from diametrically opposed positions, the angular offset of the contacts of one of said carriers being adapted to complete an electrical circuit between said carriers at different points in successive relative rotations therebetween whereby to compensate for the relative positions of shutter openings in existing cameras.

10. In a flash synchronizer adapted to be incorporated upon a conventional curtain shutter camera having a key shaft and key making one half of one rotation in each exposure, the combination with an annular terminal head applicable exteriorly to the camera case about the key shaft upon removal of its key and provided with opposing contact means at opposite sides of the shaft, of an extension adapter detachably engageable with the shaft in lieu of its original key and provided at its exposed end with means for receiving such original key whereby the adapter constitutes a separate means interposed between said shaft and key and providing for the connection thereof, a contact carrier mounted for indexing adjustment upon the adapter and provided with means for fixing its adjustment thereon, said carrier comprising bridging contact means adapted to span the space between the contacts of said head twice in each rotation of said key shaft, and terminal connections from the contacts of said head.

11. In a flash synchronizer adapted to be incorporated upon a conventional curtain shutter camera having a key shaft and key, the combination with an annular terminal head applicable exteriorly to the camera case about the key shaft upon removal of its key and provided with contact means, of an extension adapter detachably engageable with the shaft in lieu of its original key and provided at its exposed end with means for receiving such original key whereby the adapter constitutes a separate means interposed between said shaft and key and providing for the connection thereof, a contact carrier mounted for indexing adjustment upon the adapter and provided with means for fixing its adjustment thereon, said carrier comprising contact means engageable with the contact means of the terminal head in the course of key shaft rotation.

12. In a flash synchronizer adapted to be incorporated upon a conventional curtain shutter camera having a key shaft and key, the combination with a terminal head applicable to the camera case about the key shaft and provided with contact means, the application of said terminal head requiring the removal of the key from the key shaft, an adapter having a sleeve portion engageable with the end of the key shaft in lieu of the original key and having a reduced extremity adapted to receive such original key, whereby the adapter constitutes a means of connecting the original key to the original key shaft in a removed position providing space for said head, and a contact carrier adjustably rotatable for indexing purposes upon the sleeve portion of the adapter and provided with means for fixing its adjustment thereon, said carrier having contact means engageable with the contact means of said head in the course of key shaft and adapter rotation.

ROBERT W. SMEATON.